United States Patent
Song (10) Patent No.: US 12,462,171 B2
(45) Date of Patent: Nov. 4, 2025

(54) HIERARCHICAL CONTEXT TAGGING FOR UTTERANCE REWRITING

(71) Applicant: TENCENT AMERICA LLC, Palo Alto, CA (US)

(72) Inventor: Linfeng Song, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 1018 days.

(21) Appl. No.: 17/456,051

(22) Filed: Nov. 22, 2021

(65) Prior Publication Data

US 2023/0162055 A1 May 25, 2023

(51) Int. Cl.
*G10L 15/22* (2006.01)
*G06N 5/04* (2023.01)
*G10L 15/06* (2013.01)
*G10L 15/16* (2006.01)
*G10L 15/193* (2013.01)

(52) U.S. Cl.
CPC ............ *G06N 5/04* (2013.01); *G10L 15/063* (2013.01); *G10L 15/16* (2013.01); *G10L 15/193* (2013.01); *G10L 15/22* (2013.01); *G10L 2015/223* (2013.01); *G10L 2015/228* (2013.01)

(58) Field of Classification Search
CPC ....... G10L 15/22; G10L 15/16; G10L 15/063; G10L 15/1822; G10L 15/183; G10L 15/1815; G10L 2015/0631; G10L 15/30; G10L 2015/223; G10L 15/08; G10L 17/22; G10L 15/187; G10L 15/05; G10L 2015/227; G10L 2015/226; G06N 20/00; G06N 3/047; G06N 5/022; G06N 3/08; G06F 40/284; G06F 40/56; G06F 40/216; G06F 16/3329; G06F 16/90332; G06F 40/30; G06F 40/20; G06F 40/289
USPC ........................................................... 704/9
See application file for complete search history.

(56) References Cited

U.S. PATENT DOCUMENTS

| | | | |
|---|---|---|---|
| 11,443,120 B2 * | 9/2022 | Poddar | G06F 16/90332 |
| 11,610,061 B2 * | 3/2023 | Eisenschlos | G06F 40/253 |
| 11,610,584 B2 * | 3/2023 | Lai | G06F 16/3329 |
| 11,625,543 B2 * | 4/2023 | Xia | G06F 40/56 |
| | | | 704/9 |
| 11,763,091 B2 * | 9/2023 | Thor | G06F 40/284 |
| | | | 704/9 |
| 11,860,684 B2 * | 1/2024 | Yang | G06N 3/045 |

(Continued)

OTHER PUBLICATIONS

International Search Report dated Jan. 31, 2023 in International Application No. PCT/US22/45140.

(Continued)

*Primary Examiner* — Vijay B Chawan
(74) *Attorney, Agent, or Firm* — Sughrue Mion, PLLC (57) ABSTRACT

Hierarchical context tagging for utterance rewriting comprising computer code for obtaining source tokens and context tokens, encoding the source tokens and the context tokens to generate source contextualized embeddings and context contextualized embeddings, tagging the source tokens with tags indicating a keep or delete action for each source token of the source tokens, selecting a rule to insert before the each source token, wherein the rule contains a sequence of one or more slots, and generating spans from the context tokens, wherein each span corresponds to one of the one or more slots of the selected rule.

20 Claims, 6 Drawing Sheets

(56) References Cited

U.S. PATENT DOCUMENTS

| | | | |
|---|---|---|---|
| 12,026,187 B2 * | 7/2024 | Boytsov | G06N 3/047 |
| 2004/0220797 A1 * | 11/2004 | Wang | G06F 40/205 |
| | | | 704/9 |
| 2015/0302002 A1 * | 10/2015 | Mathias | G06F 40/56 |
| | | | 704/9 |
| 2018/0307679 A1 * | 10/2018 | Duong | G06N 3/082 |
| 2019/0035307 A1 * | 1/2019 | Mourton | G09B 23/285 |
| 2019/0188257 A1 * | 6/2019 | Iida | G06N 3/045 |
| 2019/0324527 A1 * | 10/2019 | Presant | G06F 16/951 |
| 2021/0027025 A1 * | 1/2021 | Olabiyi | G10L 15/063 |
| 2021/0150152 A1 * | 5/2021 | Galitsky | G06F 40/56 |
| 2021/0174204 A1 * | 6/2021 | Yin | G06N 3/08 |
| 2021/0184995 A1 * | 6/2021 | Jones | G06F 40/58 |
| 2021/0217408 A1 * | 7/2021 | Hakkani-Tur | G06N 3/02 |
| 2021/0374358 A1 * | 12/2021 | Xia | G06N 3/047 |
| 2022/0013126 A1 * | 1/2022 | Haynor | G10L 15/16 |
| 2022/0068462 A1 * | 3/2022 | Dolan | G10L 25/63 |
| 2022/0114346 A1 * | 4/2022 | Galitsky | G16H 50/20 |
| 2022/0206958 A1 * | 6/2022 | LeMay | G06F 12/0831 |
| 2023/0120940 A1 * | 4/2023 | Qiu | G06F 40/284 |
| | | | 704/245 |
| 2024/0095454 A1 * | 3/2024 | Vu | G06F 40/279 |

OTHER PUBLICATIONS

Written Opinion of the International Searching Authority dated Jan. 31, 2023 in International Application No. PCT/US22/45140.

* cited by examiner

HIERARCHICAL CONTEXT TAGGING FOR UTTERANCE REWRITING

FIELD

Embodiments of the present disclosure relate to the field of utterance rewriting. More specifically, the present disclosure relates to hierarchical context tagging and multi-span tagging models for dialogue rewriting.

BACKGROUND

Modeling dialogue between humans and machines is an important field with high commercial value. For example, modeling dialogue may include tasks such as dialogue response planning, question answering, and semantic parsing in conversational settings. Recent advances in deep learning and language model pre-training have greatly improved performance on many sentence-level tasks. However, these models are often challenged by coreference, anaphora, and ellipsis that are common in longer form conversations. Utterance rewriting has been proposed to resolve these references locally by editing dialogues turn-by-turn to include past context. This way, models only need to focus on the last rewritten dialogue turn. Self-contained utterances also allow models to leverage sentence-level semantic parsers for dialogue understanding.

Past work on utterance rewriting frames it as a standard sequence-to-sequence (seq-to-seq) problem, applying RNNs or Transformers and requires re-predicting tokens shared between source and target utterances. To ease the redundancy, models may include a copy mechanism that supports copying source tokens instead of drawing from a separate vocabulary. However, generating all target tokens from scratch remains a burden and result in models that do not generalize well between data domains.

Overlaps between source and target utterances can be exploited by converting rewrite generation into source editing through sequence tagging. This tagging vastly simplifies the learning problem: predict a few fixed-length tag sequences, each with a small vocabulary. Some related art methods may predict edit actions to keep or delete a source token and optionally add a context span before the token. Datasets are rewritten where most targets can be covered by adding at most one context span per source token. Unfortunately, this method leads to low target phrase coverage because out-of-context tokens or a series of non-contiguous spans cannot be inserted to the single-span tagger.

Other related art methods may predict a word-level edit matrix between context-source pairs. This approach can add arbitrary non-contiguous context phrases before each source token. Though it may cover more target phrases, an edit matrix involves $O(m)$ times more tags than a sequence for m context tokens. Since any subset of context tokens can be added to the source, the flexibility makes it easier to produce ungrammatical outputs.

Still other related art methods may combine a source sequence tagger with an LSTM-based decoder. However, reverting back to a seq-to-seq approach introduces the same large search space issue that sequence tagging was designed to avoid.

SUMMARY

Provided are a hierarchical context tagger (HCT) method and/or apparatus that mitigates low phrase coverage by predicting slotted rules (e.g., "besides") whose slots are later filled with context spans. As an example, according to embodiments of the present disclosure, the HCT tags the source string with token-level edit actions and slotted rules and fills in the resulting rule slots with spans from the dialogue context. Rule tagging allows the HCT to add out-of-context tokens and multiple spans at once. Advantageously, several benchmarks show that this method of HCT can improve rewriting systems by up to 17.8 BLEU points.

According to embodiments, a method of hierarchical context tagging for utterance rewriting is performed by at least one processor and includes obtaining source tokens and context tokens, encoding the source tokens and the context tokens to generate first source contextualized embeddings and first context contextualized embeddings, tagging the source tokens with tags indicating a keep or delete action for each source token of the source tokens, selecting a rule, containing a sequence of one or more slots, to insert before the each source token, and generating spans from the context tokens, each span corresponding to one of the one or more slots of the selected rule.

According to embodiments, an apparatus for hierarchical context tagging for utterance rewriting comprises at least one memory configured to store computer program code and at least one processor configured to access the computer program code and operate as instructed by the computer program code. The computer program code includes first obtaining code configured to cause the at least one processor to obtain source tokens and context tokens, first encoding code configured to cause the at least one processor to encode the source tokens and the context tokens to generate first source contextualized embeddings and first context contextualized embeddings, first tagging code configured to cause the at least one processor to tag the source tokens with tags indicating a keep or delete action for each source token of the source tokens, first selecting code configured to cause the at least one processor to select a rule, containing a sequence of one or more slots, to insert before the each source token, and first generating code configured to cause the at least one processor to generate spans from the context tokens, each span corresponding to one of the one or more slots of the selected rule.

According to embodiments, a non-transitory computer-readable medium stores instructions that, when executed by at least one processor for hierarchical context tagging for utterance rewriting, cause the at least one processor to obtain source tokens and context tokens, encode the source tokens and the context tokens to generate first source contextualized embeddings and first context contextualized embeddings, tag the source tokens with tags indicating a keep or delete action for each source token of the source tokens, select a rule, containing a sequence of one or more slots, to insert before the each source token, and generate spans from the context tokens, each span corresponding to one of the one or more slots of the selected rule.

DETAILED DESCRIPTION

The present disclosure relates to a hierarchical context tagger (HCT) that tags the source string with token-level edit actions and slotted rules and fills in the resulting rule slots with spans from the dialogue context. This rule tagging allows HCT to add out-of-context tokens and multiple spans at once and improve dialogue rewriting. According to embodiments of the present disclosure, the rules may also be clustered further to truncate the long tail of the rule distribution.

Utterance rewriting aims to recover coreferences and omitted information from the latest turn of a multi-turn dialogue. Methods that tag rather than linearly generate sequences are stronger in both in-domain rewriting and out-of-domain rewriting settings because tagger's have smaller search space as they can only copy tokens from the dialogue context. However, these methods may suffer from low coverage when phrases that must be added to a source utterance cannot be covered by a single context span. This can occur in languages like English that introduce tokens such as prepositions into the rewrite for grammaticality. The low coverage issue can cause severe performance decrease on the overall dialogue rewriting task.

The HCT, according to embodiments, mitigates the issue of low coverage by predicting slotted rules whose slots are later filled with context spans. In particular, a search space of a span-based predictor is kept small while extending it to non-contiguous context spans and tokens missing from the context altogether. For non-contiguous context spans, first, a multi-span tagger (MST) is built. The MST autoregressively predicts several context spans per source token. A syntax-guided method is then used to automatically extract multi-span labels per target phrase. Example embodiments further describe a hierarchical context tagger (HCT) that predicts a slotted rule per added phrase before filling the slots with spans. The slotted rules are learnt from training data and address tokens missing from the context and may include out-of-context tokens (e.g., determiners and prepositions). By conditioning a multi-span predictor on a small set of slotted rules, the HCT can achieve higher phrase coverage than the MST. Specifically, the HCT dramatically enhances the performance gains of MST by first planning rules and then realizing their slots.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
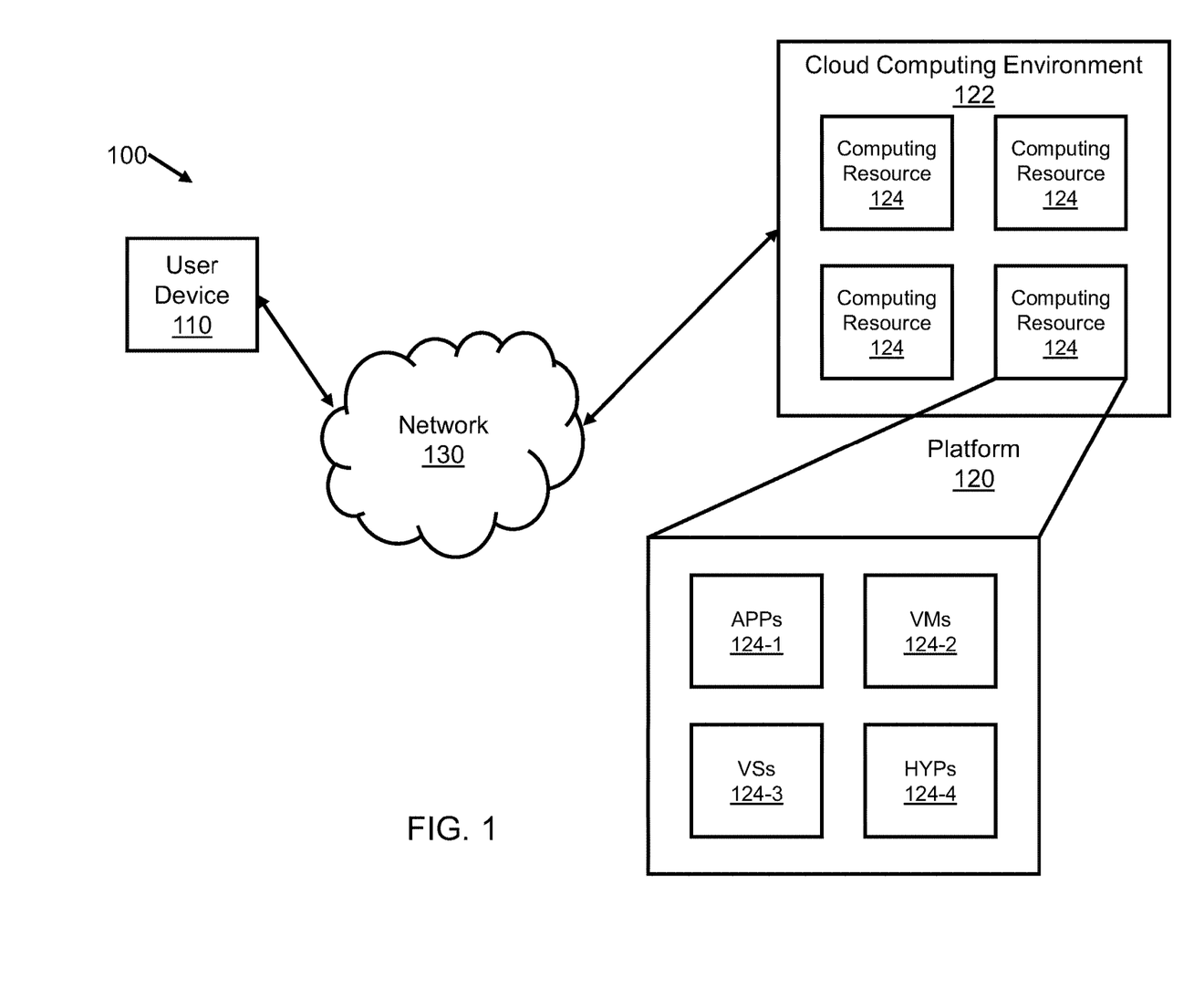
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
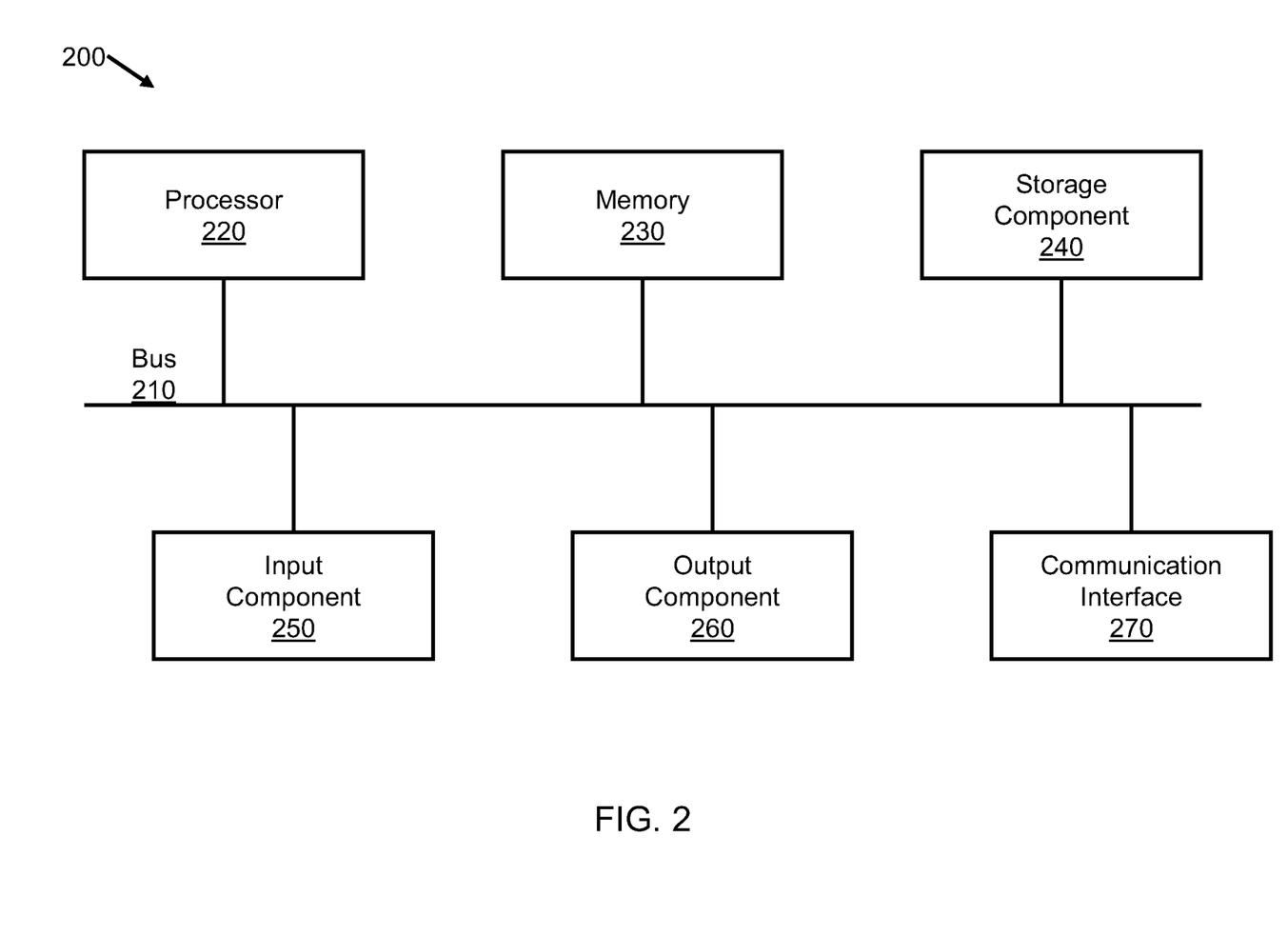
FIG. 2 is a diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
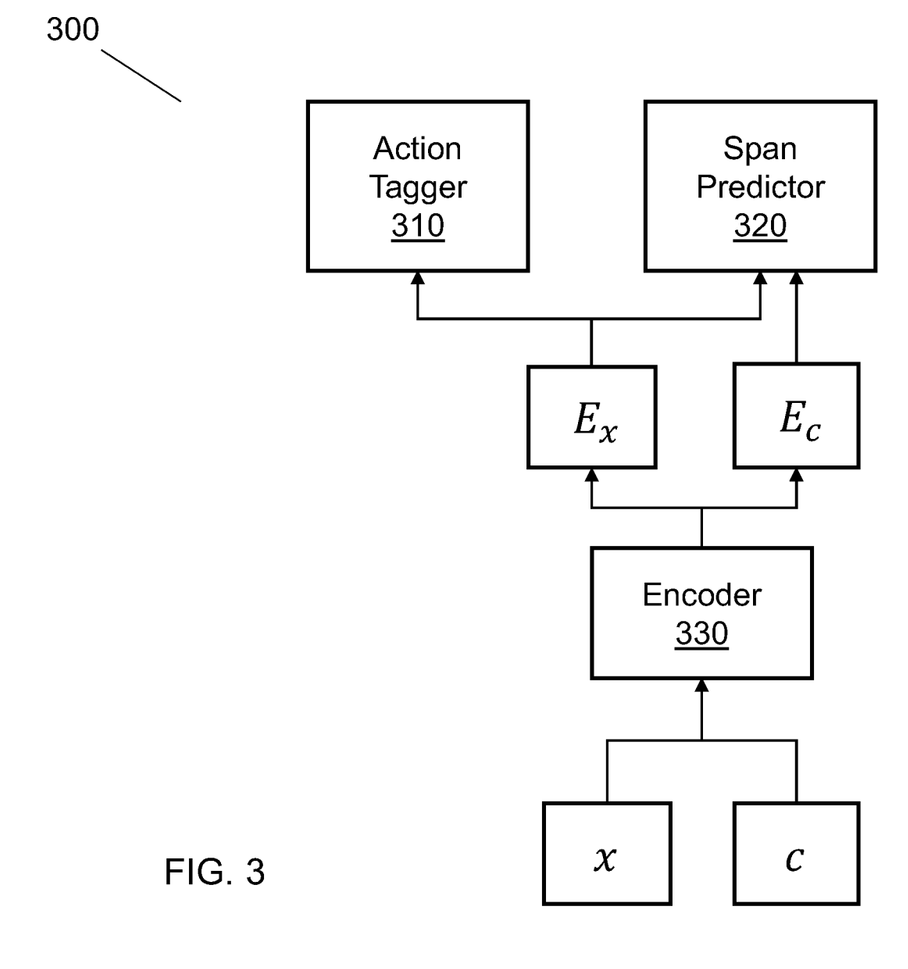
FIG. 3 is an example illustration of an MST according to embodiments.

FIG. 3 is an example illustration of an MST 300 according to embodiments. The MST 300 includes an action tagger 310 on a source sequence and a semi-autoregressive span predictor 320 over context utterances. According to embodiments, the action tagger 310 and the span predictor 320 may take two token sequences as inputs: source $x=(x_1, \ldots, x_n)$ and context $c=(c_1, \ldots, c_m)$. For each source token, the action tagger 310 decides whether or not to keep the source token. Deleted source tokens may later be replaced with context spans from the span predictor 320. In parallel, the span predictor 320 generates a variable-length sequence of context spans to insert before each source token. According to embodiments, the span predictor 320 may be a multi-span predictor that is capable of predicting one or more spans at once.

According to embodiments, the tokens from context utterances c may be concatenated with source tokens x and fed into an encoder 330. According to embodiment, a BERT model may be used as the encoder 330 and may be defined by the following equation:

$$E_c;E_x=\text{BERT}(c;x) \quad \text{(Equation 1)}$$

where $E_c \in \mathbb{R}^{m \times d}$ and $E_x \in \mathbb{R}^{n \times d}$ are the resulting d-dimensional contextualized embedding's. Thus, global information from c and x is encoded into both contextualized embedding's $E_c$ and $E_x$.

According to embodiments, the action tagger 310 then tags the source token $x_i$ with a keep or delete action by linearly projecting its embedding $e_i \in \mathbb{R}_d$ (the ith row of $E_x$) and may be defined by the following equation:

$$p(a_i|x_i)=\text{Softmax}(W_a e_i) \quad \text{(Equation 2)}$$

where $W_a \in \mathbb{R}^{2 \times d}$ is a learned parameter matrix.

The span predictor 320 may then output one or more spans, at most l spans $\{s_{ij}\}_{j \leq l}$, from context c to insert before each source token $x_i$. According to embodiments, the span predictor 320 predicts these l spans $\{s_{ij}\}_{j \leq l}$ autoregressively. That is, the jth span $s_{ij}$ depends on all previous spans $\{s_{ij'}\}_{j'<j}$ at position i, which may be defined as follows:

$$p(s_{ij}|c,x_i,j)=\text{MST}_s(c,x_i,\{s_{ij'}\}_{j'<j}) \quad \text{(Equation 3)}$$

In some embodiments, the generation of span $s_{ij}$ may be modeled as predicting its start and end indices in context c. These two indices may be captured through separate distributions over positions of context c, given source token $x_i$. In an example embodiment, additive attention may be applied to let source embedding $e_i$ attend to all context embedding rows of $E_c$. For example, the jth start index at source position i of span $s_{ij}$ is predicted and may be defined by the following equation:

$$p(s_{ij}^{\uparrow}|c,x_i,j)=\text{Attn}^{\uparrow}(E_c,e_{ij}) \quad \text{(Equation 4)}$$

where the ↑ indicates the start index distribution. The end index (↓) is analogous in form. The joint probability of all spans $\{s_{ij}\}_{j \leq l}$ at source index i, denoted by $s_i$, may be defined by the following:

$$p(s_i|c,xi)=\Pi_{j=1}^{l} p(s_{ij}|c,x_i) \quad \text{(Equation 5)}$$

$$p(s_{ij}|c,x_i)=p(s_{ij}^{\uparrow}|c,x_i,j)p(s_{ij}^{\downarrow}|c,x_i,j) \quad \text{(Equation 6)}$$

Because span $s_{ij}$ depends on past spans indexed by j'<j, the span predictor 320 is considered semi-autoregressive for each source index i. Span predictor 320 continues until either j=l or $s_{ij}^{\uparrow}$ is a stop symbol (i.e., 0), which can be predicted at j=0 for an empty span. A span index at step j depends on the attention distribution over context tokens at step j-1, which may be defined by the follow equations:

$$e_{ij}=\text{ReLU}(W_u[\widehat{e_{ij}};e_{i(j-1)}]) \quad \text{(Equation 7)}$$

$$\hat{e}_{ij}=\Sigma_{k \in [1,m]}\alpha_{k(j-1)} \cdot e'_k \quad \text{(Equation 8)}$$

where $a_{k(j-1)}$ is the attention coefficient between $x_k'$ and $x_{j-1}$ and $W_u \in \mathbb{R}^{d \times 2d}$. Similar to the notion of coverage in machine translation, this helps maintain awareness of past attention distributions.

According to embodiments, the MST is trained to minimize cross-entropy $L_e$ over gold actions a and spans s. This may be defined by the following equation:

$$L_e=-\Sigma_{i=1}^n \log p(a_i|x_i)p(s_i|c,x_i) \quad \text{(Equation 9)}$$

Since the MST according to embodiments of the present disclosure runs in parallel over source tokens, output sequences may be disjointed. The MST according to embodiments of the present disclosure optimizes sentence-level BLEU under an RL objective to encourage more fluent predictions. Along with minimizing cross-entropy $L_e$, according to equation (9), embodiments of the present disclosure also maximizes similarity between gold x* and sampled $\hat{x}$ as reward term w. This may be defined by the following equation:

$$L_r=-\Delta(\hat{x},x^*)\log p(\hat{x}|c,x)=-w \log p(\hat{x}|c,x) \quad \text{(Equation 10)}$$

where Δ denotes sentence-level BLEU score and $L_r$ denotes the RL loss. The final loss may be calculated as a weighted average of the cross-entropy $L_e$ and RL losses $L_r$, determined in equations (9) and (10) respectively, and defined by the following equation:

$$L=(1-\lambda)L_e+\lambda L_r \quad \text{(Equation 11)}$$

where λ is a scalar weight. In some embodiments, the scalar weight λ may be empirically set to 0.5.

According to embodiments of the present disclosure, the MST supports more flexible context span insertion. However, it cannot recover tokens that are missing from the context (e.g., prepositions). The embodiments below will describe a hierarchical context tagger (HCT) that uses automatically extracted rules to fill this gap.

Figure 4:
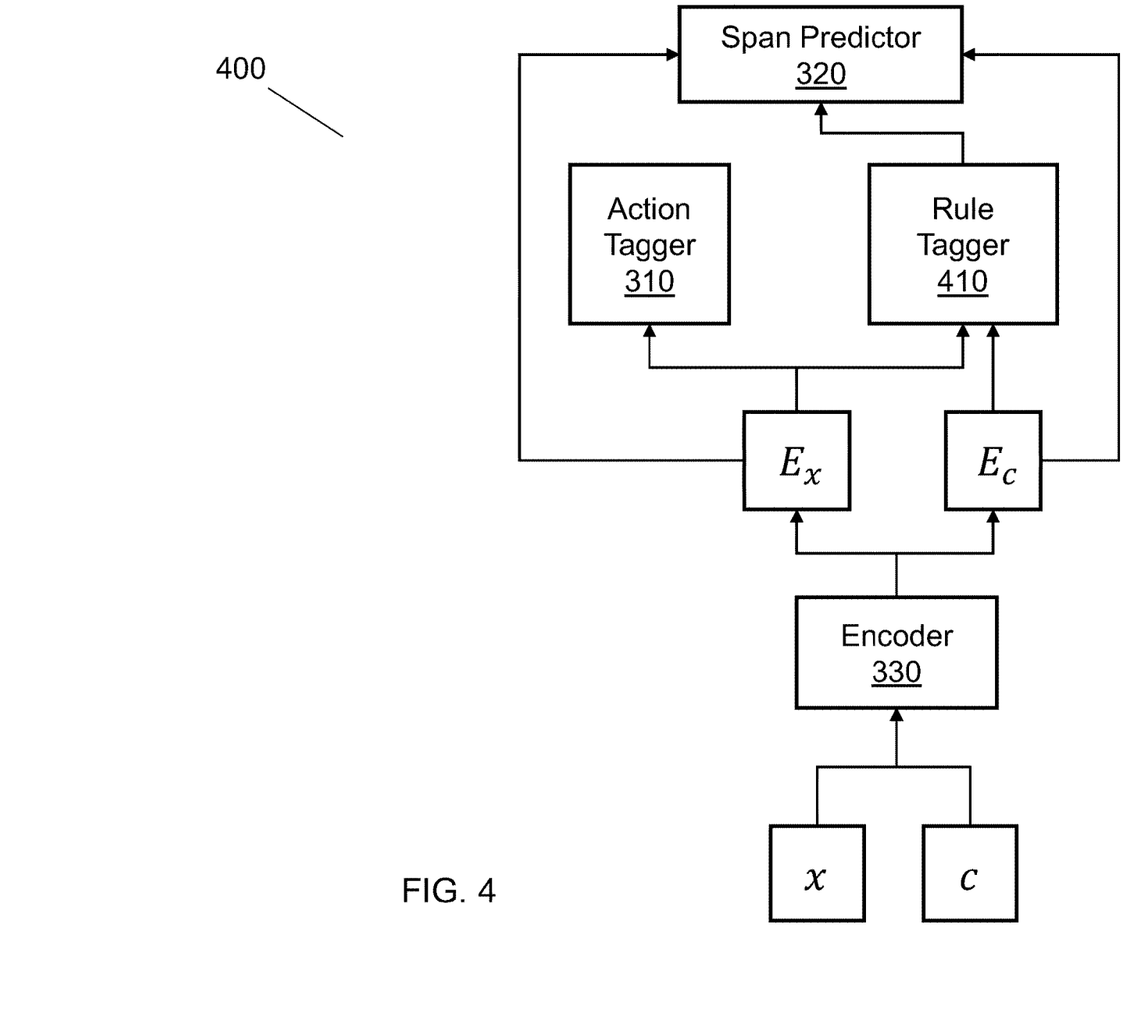
FIG. 4 is an example illustration of an HCT according to embodiments.

FIG. 4 is an example illustration of an HCT 400 according to embodiments. Descriptions for elements denoted by the same reference numerals shown in FIG. 3 may be omitted as needed. As shown in FIG. 4, the HCT 400 includes the encoder 330 and the action tagger 310 from the MST 300 described in FIG. 3. Similarly, according to embodiments of FIG. 4, the BERT model may be used as the encoder 330 and may be defined by equation (1), and the action tagger 310 may be defined by equation (2). In addition, the HCT 400 includes a rule tagger 410. The rule tagger 410 chooses which (possibly empty) slotted rule to insert before each source token. As shown in FIG. 4, the HCT 400 may be viewed in two levels. According to embodiments, in the first level, both action tagger 310 and rule tagger 410 run in parallel. This is then followed by the second level. In the second level, the tagged rules output from the rule tagger 410 are input to the span predictor 320. The span predictor 320 fills in a known number of slots per rule. Therefore, the span predictor 320 according to embodiments relating to the HCT no longer needs to produce the stop symbols (as previously described in embodiments relating to the MST 300).

According to embodiments, the rule tagger 410 selects a rule to insert before the source token by linearly projecting the embedding of source token $x_i$, which may be defined by the following equation:

$$p(r_i|x_i)=\text{Softmax}(W_r e_i) \quad \text{(Equation 12)}$$

where $W_r$ parameterizes a rule classifier of p rules that includes the null rule for an empty insertion.

The span predictor 320 expands rule $r_i$ containing $k \geq 1$ slots into spans $s_i = (s_{i1}, \ldots, s_{ik})$ and may be defined as follows:

$$p(s_{ij}|c, x_i, r_i, j) = HCT_2(c, x_i, r_i, \{s_{ij'}\}_{j'<j}) \quad \text{(Equation 13)}$$

where $1 \leq j \leq k$. Unlike the MST, the HCT according to embodiments learns rule-specific slot embeddings to anchor each span to a rule $r_i$. Instead of conditioning spans $s_i$ on all tokens x and rules r, it is sufficient to restrict it to a single source token $x_i$ and rule $r_i$.

To condition the span predictor 320 on tagged rules, the HCT according to embodiments of the present disclosure learns contextualized rule embeddings using the same input token BERT encoder. Slots at the same relative position across rules are represented by the same special slot token. For example, the rule "and" is assigned the tokens ([SL0] and [SL1]), whereas the rule is simply [SL0]. Embedding's of these [SL*] tokens are learned from scratch and allow relative positional information to be shared across rules. A special [CLS] token is prepended to a rule's token sequence before applying the BERT encoder, and its embedding is used to represent the rule. Context-source attention, defined in equation (4), may be biased on a rule embedding by updating the query embedding ei as follows:

$$e_i = \text{ReLU}(W_c[e_i; r_i]) \quad \text{(Equation 14)}$$

where $W_c \in \mathbb{R}^{d \times 2d}$ is a learned projection matrix. Equation (4) can then be replaced by equation (15) as follows:

$$p(s_{ij}^{\uparrow}|c, x_i, r_i, j) = \text{Attn}^{\uparrow}(E_c; e_{ij}) \quad \text{(Equation 15)}$$

The HCT's nested phrase predictor may also be seen as learning grammar over inserted rules. Each source token is preceded by a start symbol that can be expanded into some slotted rule. Rules come from a fixed vocabulary and take the form of a sequence of terminal tokens and/or slots (e.g., "by" or "in"). In contrast, slots are non-terminals that can only be rewritten as terminals from the context utterances (i.e., spans). While slotted rules are produced from start symbols in a roughly context-free way—conditioned on the original source tokens—terminal spans within a rule are not. Spans in the same rule are predicted autoregressively to support coherency of successive spans.

According to embodiments, the HCT may be optimized by minimizing loss, which may be defined by the following:

$$L_e = -\Sigma_{i=1}^{n} \log p(a_i|x_i) p(r_i|x_i) p(s_i|c, x_i, r_i) \quad \text{(Equation 16)}$$

where $p(s_i|c, x_i, r_i) = \Pi_{j=1}^{l} p(s_{ij}|c, x_i, r_i)$ and is analogous to equation (5). The HCT, according to embodiments of the present disclosure, optimizes the same RL objective (RL loss) as the MST by replacing $p(\hat{x}|c, x)$ in equation (7) with $p(\hat{x}|c, x, r)$ as follows:

$$L_r = -\Delta(\hat{x}, x^*) \log p(\hat{x}|c, x, r) = -w \log p(\hat{x}|c, x, r) \quad \text{(Equation 17)}$$

Its total loss $L_{HCT}$ may be calculated as a weighted average of the loss $L_e$ and RL loss $L_r$ from equations (16) and (17), respectively, and may be defined by the following equation (similar to equation (11)):

$$L_{HCT} = (1-\lambda)L_e + \lambda L_r \quad \text{(Equation 18)}$$

where $\lambda$ is a scalar weight. In some embodiments, the scalar weight $\lambda$ may be empirically set to 0.5.

Figure 5:
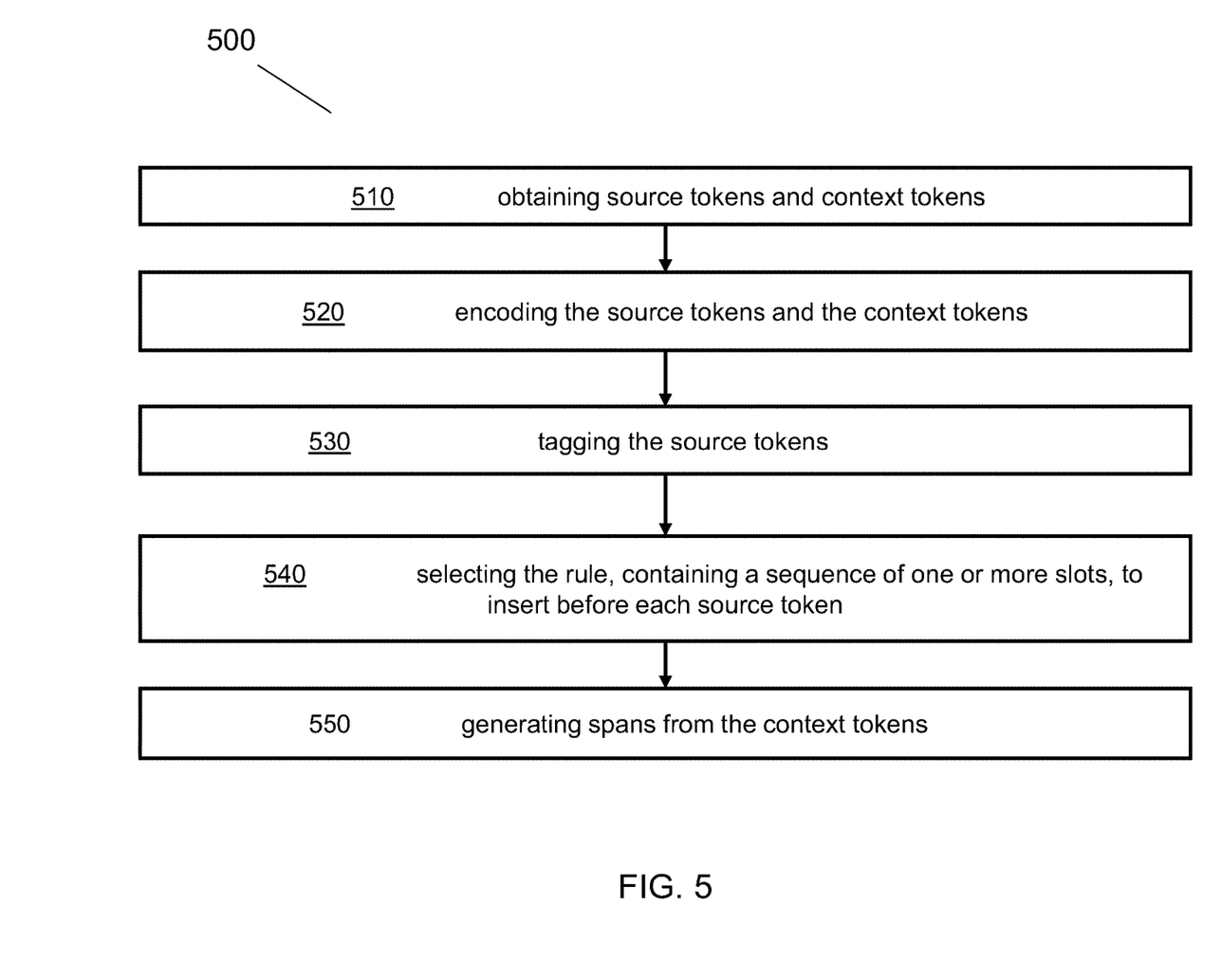
FIG. 5 is an example flowchart illustrating a method of HCT for utterance rewriting according to embodiments.

FIG. 5 is an example flowchart illustrating a method 500 of HCT for utterance rewriting, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510 the method includes obtaining source tokens and context tokens.

In operation 520, the method 500 includes encoding the source tokens and the context tokens to generate first source contextualized embeddings and first context contextualized embeddings. In example embodiments, the source tokens and the context tokens may also be concatenated before encoding. Further, in example embodiments, a predetermined token may be appended to the source tokens and the context tokens. The appended source tokens and context tokens are then encoded, instead of the obtained source and context tokens, to generate second source contextualized embeddings and second context contextualized embeddings. The second source contextualized embeddings and second context contextualized embeddings are then used to represent a rule (selected in operation 540).

In operation 530, the method 500 includes tagging the source tokens. The tags indicate whether or not to keep or delete each source token of the source tokens. The source tokens may be tagged by linearly projecting a corresponding source contextualized embedding using a learned parameter matrix.

In operation 540, the method 500 includes selecting the rule, containing a sequence of one or more slots, to insert before the each source token. The rule may be selected by linearly projecting its corresponding source contextualized embedding using a rule classifier. The rule comes from a fixed vocabulary. The sequence of one or more slots are non-terminals that are only rewritten as terminals from the generated spans (in operation 550) and a predetermined number of the one and more slots are filled. Additionally, slots at the same relative position across rules may be represented by a same special slot token.

In operation 550, the method 500 includes generating spans from the context tokens, each span corresponding to one of the one or more slots of the selected rule and a predetermined number of the one and more slots are filled. The spans are generated autoregressively. Meaning, a current span is dependent on all previous spans for a corresponding source token.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
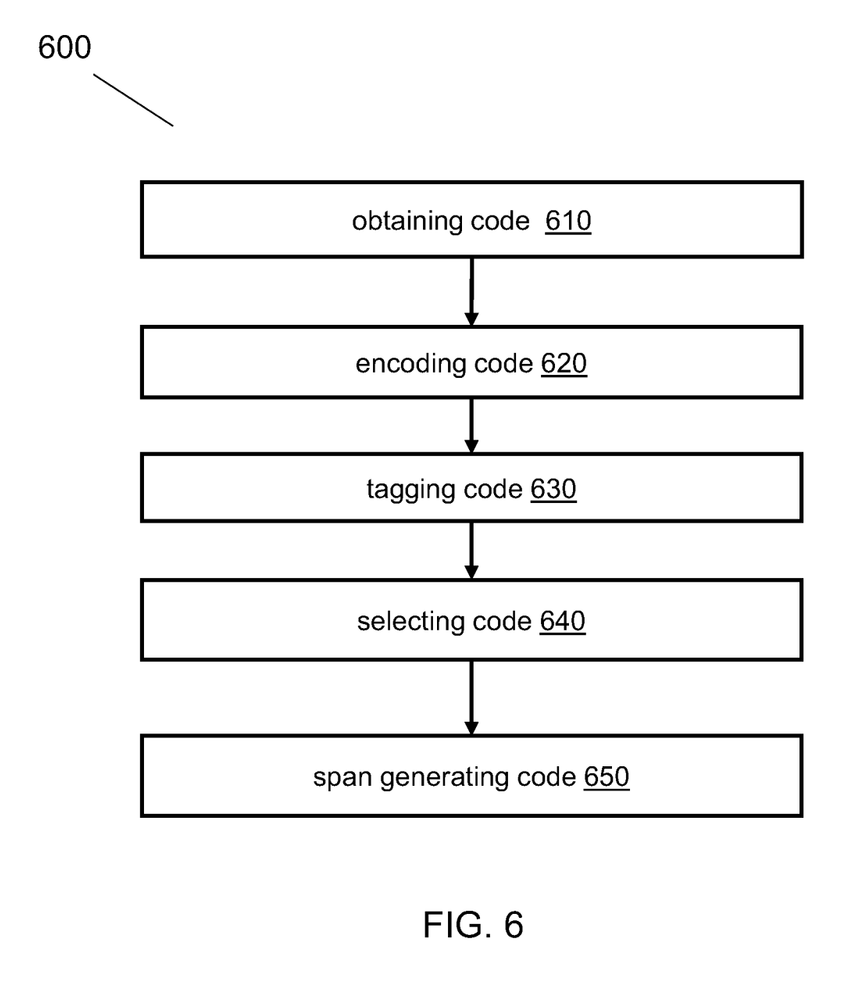
FIG. 6 is an example block diagram illustrating an apparatus 600 for utterance rewriting using HCT according to embodiments

FIG. 6 is an example block diagram of an apparatus 600 for utterance rewriting using HCT, according to embodiments.

As shown in FIG. 6, the apparatus 600 includes obtaining code 610, encoding code 620, tagging code 630, selecting code 640, and span generating code 650.

The obtaining code 610 is configured to cause the at least one processor to obtain source tokens and context tokens.

The encoding code 620 is configured to cause the at least one processor to encode the source tokens and the context tokens to generate source contextualized embeddings and context contextualized embeddings. The apparatus 600 may also include concatenating code configured to cause at least one of the processors to concatenate the source tokens and the context tokens before encoding. Further, a predetermined token may be appended to the source tokens and the context tokens. The appended source tokens and context tokens are then encoded, instead of the obtained source and context tokens, to generate second source contextualized embeddings and second context contextualized embeddings. The second source contextualized embeddings and second context contextualized embeddings are then used to represent a rule (selected using selecting code 640).

The tagging code 630 is configured to cause at least one processor to tag each source token of the source tokens with tags indicating whether to keep or delete action each source token of the source tokens. The source tokens may be tagged by linearly projecting a corresponding source contextualized embedding using a learned parameter matrix.

The selecting code 640 is configured to cause at least one processor to select the rule to insert before the each source token. Each rule contains a sequence of one or more slots. The rule may be selected by linearly projecting its corresponding source contextualized embedding using a rule classifier. The rule comes from a fixed vocabulary. The sequence of one or more slots are non-terminals that are only rewritten as terminals from the generated spans (using span generating code 650) and a predetermined number of the one and more slots are filled. Additionally, apparatus 600 may include a generating a special slot token to represent slots at the same relative position across rules.

The span generating code 650 is configured to cause at least one processor to generate spans from the context tokens, each span corresponding to one of the one or more slots of the selected rule. The spans are generated autoregressively. Meaning, a current span is dependent on all previous spans for a corresponding source token.

Although FIG. 6 shows example blocks of the apparatus, in some implementations, the apparatus may include additional blocks, fewer blocks, different blocks, or differently arranged blocks than those depicted in FIG. 6. Additionally, or alternatively, two or more of the blocks of the apparatus may be combined.

The MST and HCT models according to embodiments may significantly improve dialogue rewriting performance in terms of BLEU (Papineni et al., 2002), Rouge (Lin and Hovy, 2002) and exact match (EM) compared to previous methods on two popular benchmarks: CANARD and MUDOCO. Table 2 displays performance of embodiments of the present disclosure on the CANARD benchmark.

TABLE 2

|  | $B_1$ | $B_2$ | $B_4$ | $R_1$ | $R_2$ | $R_L$ |
|---|---|---|---|---|---|---|
| Pro-Sub | 60.4 | 55.3 | 47.4 | 73.1 | 63.7 | 73.9 |
| Ptr-Gen | 67.2 | 60.3 | 50.2 | 78.9 | 62.9 | 74.9 |

TABLE 2-continued

|  | $B_1$ | $B_2$ | $B_4$ | $R_1$ | $R_2$ | $R_L$ |
|---|---|---|---|---|---|---|
| RUN | 70.5 | 61.2 | 49.1 | 79.1 | 61.2 | 74.7 |
| RaST | 55.4 | 54.1 | 51.6 | 61.6 | 50.3 | 61.9 |
| MST | 71.7 | 69.0 | 65.4 | 75.2 | 62.1 | 79.0 |
| HCT | 72.4 | 70.8 | 68.0 | 78.7 | 66.2 | 79.3 |

BLEU-n ($B_n$) and ROUGE-n/L ($R_{n/L}$) on CA-NARD. Pro-Sub, Ptr-Gen, and RUN results are drawn from their respective works.

Table 3 displays performance of embodiments of the present disclosure on the MUDOCO benchmark. As seen in Tables 2 and 3, the present disclosure using the HCT model delivers improved overall dialogue rewriting performance scores.

TABLE 3

|  | Calling | | Messag. | | Music | | All | |
|---|---|---|---|---|---|---|---|---|
|  | $B_4$ | EM | $B_4$ | EM | $B_4$ | EM | $B_4$ | EM |
| Joint | 95.4 | 77.7 | 94.6 | 68.8 | 83.6 | 40.9 | 93.0 | 69.3 |
| RaST | 93.7 | 75.2 | 92.8 | 69.1 | 81.6 | 44.6 | 91.2 | 68.5 |
| MST | 93.5 | 73.7 | 92.1 | 64.7 | 84.1 | 51.1 | 91.3 | 65.8 |
| HCT | 95.7 | 75.8 | 94.9 | 70.8 | 84.0 | 49.0 | 93.7 | 70.0 |
| -RL | 95.8 | 75.7 | 94.5 | 69.8 | 83.9 | 45.9 | 93.5 | 69.2 |

BLEU-4 ($B_4$) and exact match accuracy (EM) on MuDoCo. Only three of the six domains are shown. The "-RL" line ablates BLEU rewards under an RL objective.

The techniques described above, can be implemented as computer software using computer-readable instructions and physically stored in one or more computer-readable media or by a specifically configured one or more hardware processors. For example, FIG. 1 shows an environment 100 suitable for implementing various embodiments. In one example, the one or more processors execute a program that is stored in a non-transitory computer-readable medium.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor of a multi-span tagger (MST) of hierarchical context tagging for utterance rewriting, the method comprising:
obtaining source tokens and context tokens;
encoding, using a Bidirectional Encoder Representations from Transforms (BERT) model, the source tokens and the context tokens to generate first source contextualized embeddings and first context contextualized embeddings;
tagging, using the first source contextualized embeddings, the source tokens with tags indicating a keep or delete action for each source token of the source tokens;
selecting, using the first context contextualized embeddings, a rule containing a sequence of one or more slots to insert before the each source token;
generating spans from the context tokens, each span corresponding to one of the one or more slots of the selected rule; and
performing, using the spans, utterance rewriting on a multi-turn dialogue to recover one or more coreferences on a latest turn of the multi-turn dialogue.

2. The method of claim 1, wherein the source tokens and the context tokens are concatenated before encoding.

3. The method of claim 1, further comprising:
adding a predetermined token to the beginning of the source tokens and the context tokens; and
encoding the source tokens and the context tokens, with the predetermined token added, to generate second source contextualized embeddings and second context contextualized embeddings,
wherein the second source contextualized embeddings and second context contextualized embeddings are used to represent the rule.

4. The method of claim 1, wherein the source tokens are tagged by linearly projecting a corresponding source contextualized embedding using a learned parameter matrix.

5. The method of claim 1, wherein the rule is selected by linearly projecting a corresponding source contextualized embedding using a rule classifier.

6. The method of claim 1, wherein the sequence of one or more slots are non-terminals that are only rewritten as terminals from the generated spans; and
wherein a predetermined number of the one and more slots are filled.

7. The method of claim 1, wherein the spans are generated autoregressively, and a current span is dependent on all previous spans for a corresponding source token.

8. The method of claim 1, further comprising generating a special slot token to represent slots at a same position across rules.

9. The method of claim 1, wherein a deleted source token is replaced with the generated spans.

10. An apparatus for utterance rewriting using hierarchical context tagging, the apparatus comprising:
at least one memory configured to store computer program code;
at least one processor configured to access the computer program code and operate as instructed by the computer program code, the computer program code including:
first obtaining code configured to cause the at least one processor to obtain source tokens and context tokens;
first encoding code configured to cause the at least one processor to encode, using a Bidirectional Encoder Representations from Transforms (BERT) model, the source tokens and the context tokens to generate first source contextualized embeddings and first context contextualized embeddings;
first tagging code configured to cause the at least one processor to tag, using the first source contextualized embeddings, the source tokens with tags indicating a keep or delete action for each source token of the source tokens;
first selecting code configured to cause the at least one processor to select, using the first context contextualized embeddings, a rule containing a sequence of one or more slots to insert before the each source token;
first generating code configured to cause the at least one processor to generate spans from the context tokens, each span corresponding to one of the one or more slots of the selected rule; and
performing code configured to cause the at least one processor to perform, using the spans, utterance rewriting on a multi-turn dialogue to recover one or more coreferences on a latest turn of the multi-turn dialogue.

11. The apparatus of claim 10, wherein the source tokens and the context tokens are concatenated before encoding.

12. The apparatus of claim 10, further comprising:
concatenating code configured to cause the at least one processor to add a predetermined token to the beginning of the source tokens and the context tokens; and
second encoding code configured to cause the at least one processor to encode the source tokens and the context tokens, with the added predetermined token, to generate second source contextualized embeddings and second context contextualized embeddings,
wherein the second source contextualized embeddings and second context contextualized embeddings are used to represent the rule.

13. The apparatus of claim 10, wherein the source tokens are tagged by linearly projecting a corresponding source contextualized embedding using a learned parameter matrix, and the rule is selected by linearly projecting a corresponding source contextualized embedding using a rule classifier.

14. The apparatus of claim 10, wherein the spans are generated autoregressively, and a current span is dependent on all previous spans for a corresponding source token.

15. The apparatus of claim 10, further comprising second generating code configured to cause the at least one processor to generate a special slot token to represent slots at a same position across rules.

16. The apparatus of claim 10, wherein a deleted source token is replaced with the generated spans.

17. A non-transitory computer readable medium storing instructions, that when executed by at least one processor of a multi-span tagger (MST), cause the at least one processor to:
obtain source tokens and context tokens;
encode, using a Bidirectional Encoder Representations from Transforms (BERT) model, the source tokens and the context tokens to generate first source contextualized embeddings and first context contextualized embeddings;
tag, using the first source contextualized embeddings, the source tokens with tags indicating a keep or delete action for each source token;
select, using the first context contextualized embeddings, a rule containing a sequence of one or more slots, to insert before the each source token;

generate spans from the context tokens, each span corresponding to one of the one or more slots of the selected rule; and performing, using the spans, utterance rewriting on a multi-turn dialogue to recover one or more coreferences on a latest turn of the multi-form dialogue.

18. The non-transitory computer-readable medium of claim 17, wherein the source tokens and the context tokens are concatenated before encoding.

19. The non-transitory computer-readable medium of claim 17, wherein the instructions, when executed by the at least one processor, further cause the at least one processor to:

add a predetermined token to the beginning of the source tokens and the context tokens; and encode the source tokens and the context tokens, with the added predetermined token, to generate second source contextualized embeddings and second context contextualized embeddings, wherein the second source contextualized embeddings and second context contextualized embeddings are used to represent the rule.

20. The non-transitory computer-readable medium of claim 17, wherein the instructions, when executed by the at least one processor, further cause the at least one processor to generate a special slot token to represent slots at a same relative position across rules.

* * * * *